G. F. STARBUCK.
TRUCK.
APPLICATION FILED SEPT. 25, 1913.

1,094,822.

Patented Apr. 28, 1914.

Witnesses.
Franklin E. Low
Ambrose E. Sullivan

Inventor:
George F. Starbuck
by his attorney, Charles V. Gooding.

UNITED STATES PATENT OFFICE.

GEORGE F. STARBUCK, OF WALTHAM, MASSACHUSETTS.

TRUCK.

1,094,822.

Specification of Letters Patent.  Patented Apr. 28, 1914.

Application filed September 25, 1913. Serial No. 791,852.

*To all whom it may concern:*

Be it known that I, GEORGE F. STARBUCK, a citizen of the United States, residing at Waltham, in the county of Middlesex and State of Massachusetts, have invented new and useful Improvements in Trucks, of which the following is a specification.

This invention relates to certain improvements in trucks particularly, though not exclusively, to the four wheel trucks.

The object of the present invention is to provide a quiet running, easy riding truck having comparatively few parts, consequently substantially reducing the cost of manufacturing the same. The truck frame of the device is pivotally mounted upon the journal boxes thereof and adapted to be moved vertically relatively to the car axles substantially without changing the relation of the axles of the truck relatively to each other, and as a result of this construction and of the arrangement of the various parts relatively to each other the wear of said several parts will be greatly reduced and the life of the truck substantially prolonged.

The object of the invention is further to provide means adapted to permit a limited lateral displacement of the truck bolster relative to its truck and to return said bolster to its state of equilibrium.

The invention consists in the combination and arrangement of parts whereby the above objects and certain other objects hereinafter appearing may be attained, as set forth in the following specification and particularly pointed out in the claims.

Figure 1:
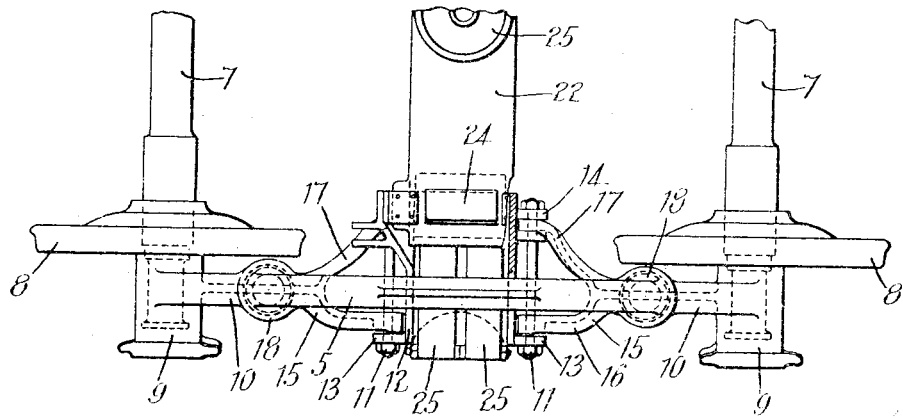
Figure 2:
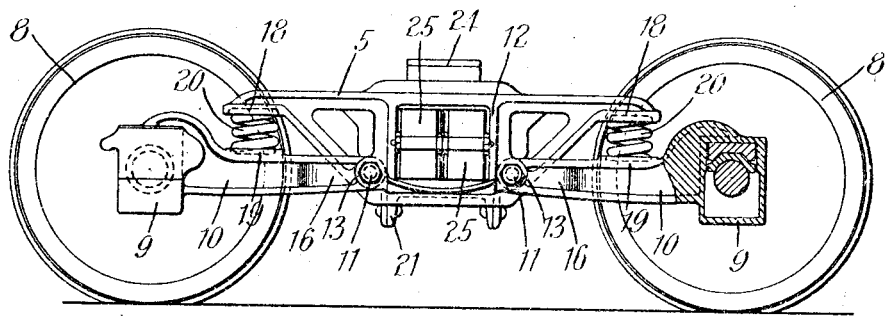
Figure 3:
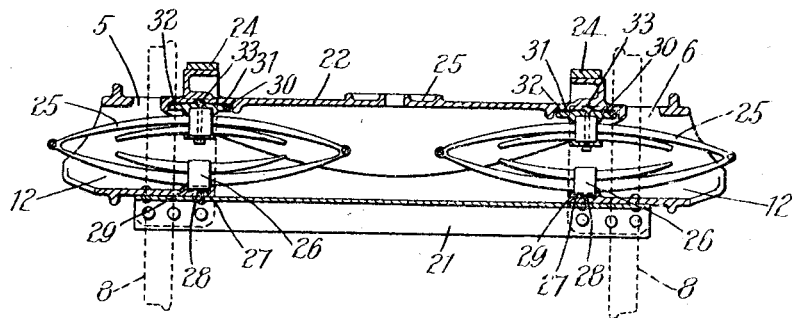

Referring to the drawings: Figure 1 is a partial plan view of a truck embodying my invention, portions of said truck being removed to save space in the drawings. Fig. 2 is a side elevation of the truck illustrated in Fig. 1. Fig. 3 is a transverse sectional elevation of the truck taken on a line extending substantially longitudinally of the median axial line of the bolster thereof.

Like numerals refer to like parts throughout the several views of the drawings.

In the drawings, 5 and 6 are the side frames of a truck, 7 the axles having wheels 8 permanently secured thereto.

9, 9 are journal boxes pivotally mounted upon the axles 7 outside of the wheels 8 and in a manner well known to those skilled in the art, therefore needing no further description. Connected with the journal boxes 9 and preferably integral therewith are arms 10 extending to and pivotally connected with the side frame located adjacent thereto by means of bolts 11. The side frames 5 and 6 are each provided with a transverse casing 12 which is arranged substantially parallel with and between the axles 7. Formed upon each side of said casing are two sets of ears 13 and 14, the ears 13 being arranged adjacent the outer end of said casing and the ears 14 adjacent the inner end of said casing, there being quite a substantial distance between the sets of ears located upon the same side of said casing. The arms 10 are forked at 15, the members 16 and 17 of said forked portion which constitute the inner ends of said arms pivotally engaging the two sets of ears 13 and 14 respectively for the purpose of providing a substantial support for said side frames and, to prevent a lateral relative movement between the journal boxes to which the arms 10 are secured and the side frame connected thereto. The side frames 5 and 6 are provided, upon opposite sides of said casing, with inverted spring seats 18 which extend outwardly toward the journal boxes 9 over the arms 10, while upon said arms 10 in juxta-relation to said inverted spring seats 18 are spring seats 19. Coil springs 20 are interposed between said spring seats 18 and 19 and yieldingly support said frames 5 and 6 relatively to the axles 7.

It will be noted that the axes of the bolts 11 are arranged substantially parallel to each other and also substantially parallel with the axes of the axels 7. Furthermore all of said axes normally lie substantially in the same horizontal plane as a result of which the movements of the axes of the bolts 11, due to the compression of the springs 20, will be substantially in a vertical plane, consequently the relation of the axles 7, 7 to each other will remain substantially unchanged, particularly as to the distance between said axles whereby the truck will ride easily.

The side frames 5 and 6 are connected or tied together by means preferably consisting of a channel 21 which is riveted to the bottom walls of the casings 12 of said side frames. A truck bolster 22 is mounted transversely of said side frames 5 and 6 and extends into the casings 12 which constitute lateral guides for the ends of said bolster.

The bolster 22 is provided with the usual truck center plate 23 and truck side bearings 24 upon which rests the body of the car, not shown in the drawings. This bolster is furthermore yieldingly mounted upon the side frames 5 and 6 by springs 25, preferably of the elliptic type and arranged in pairs at opposite ends of said bolster and extending transversely of said frames. The lower members of said springs 25 are provided with plates 26 which engage recesses 27 formed preferably in the lower walls of the casings 12. The bottom surfaces of said recesses are preferably curved and contact with the plates 26, only at the central point 28 thereof, thus constituting pivots for said springs permitting the same to be rocked laterally of said truck. The sides 29 constituting the walls of the recess 27 engage the sides of the plates 26 and position said springs preventing the displacement thereof when said springs are rocked upon the pivots 28. Plates 30 are also secured to the springs 25 against the upper portions thereof and these plates are provided preferably with curved upper faces 31, which are arranged to rock against flat surfaces 32 upon the under side of the bolster 22, said plates 26 and 30 constituting rocker plates which permit a lateral movement of the bolster 22 relatively to the side frames 5 and 6.

To position the bolster relatively to the rocker plates 30 I have provided means which preferably include a spur 33 projecting laterally from the face 31 of each of said plates and into engagement with a complementary recess 34 formed in the bolster 22, said spur and recess permitting a slight rocking movement between the plate 30 and the flat surface 32 of the bolster. The provision for lateral movement of the bolster 22 relatively to said side frames 5 and 6 is essential in relieving the strain upon the side frames and wheel flanges when the truck strikes a sharp turn in the track, but after said curve has been passed the truck bolster 22 must automatically return to its state of equilibrium relatively to the truck.

To accomplish the above result the curved faces 31 of the rocker plates 30 are each preferably formed on an arc the radius of which is substantially greater than the distance between said curved face and the pivotal point 28 for the spring carrying said plates, consequently when said springs are oscillated from one side to the other relatively to the vertical position thereof the bolster 22 will be slightly lifted owing to the contour of said plate 30 and as soon as the pressure, due to the inertia of the body of the car in rounding a curve, has been overcome by the weight of the body of said car, the springs 25 will be immediately righted and thereby return the bolster 22 to its normal position.

Having thus described my invention what I claim and desire by Letters Patent to secure is:

1. A car truck having, in combination, a pair of side frames, means adapted to tie said frames together, a pair of axles, journal boxes mounted at opposite ends of each of said axles, arms connected with each of said journal boxes, said arms extending to and pivotally connected with said side frames, the axes of said pivotal connections and said axles lying substantially parallel and normally substantially in the same plane, and springs interposed between said arms and said side frames intermediate the pivots of said arms and their respective journal boxes adapted to yieldingly support said side frames relatively to said axles.

2. A car truck having, in combination, a pair of side frames, means to tie said frames together, a pair of axles, journal boxes mounted upon opposite ends of each of said axles, arms connected with each of said journal boxes, each of said arms being forked, means adapted to pivotally connect each of the members constituting said forks to said side frames, the axes of said pivotal connections lying substantially parallel and normally substantially in the same plane, springs interposed between each of said arms and said frames adapted to yieldingly support said frames on said axles, and a bolster carried by said frames.

In testimony whereof I have hereunto set my hand in presence of two subscribing witnesses.

GEORGE F. STARBUCK

Witnesses:
 SYDNEY E. TAFT,
 LEONARD A. POWELL.